UNITED STATES PATENT OFFICE.

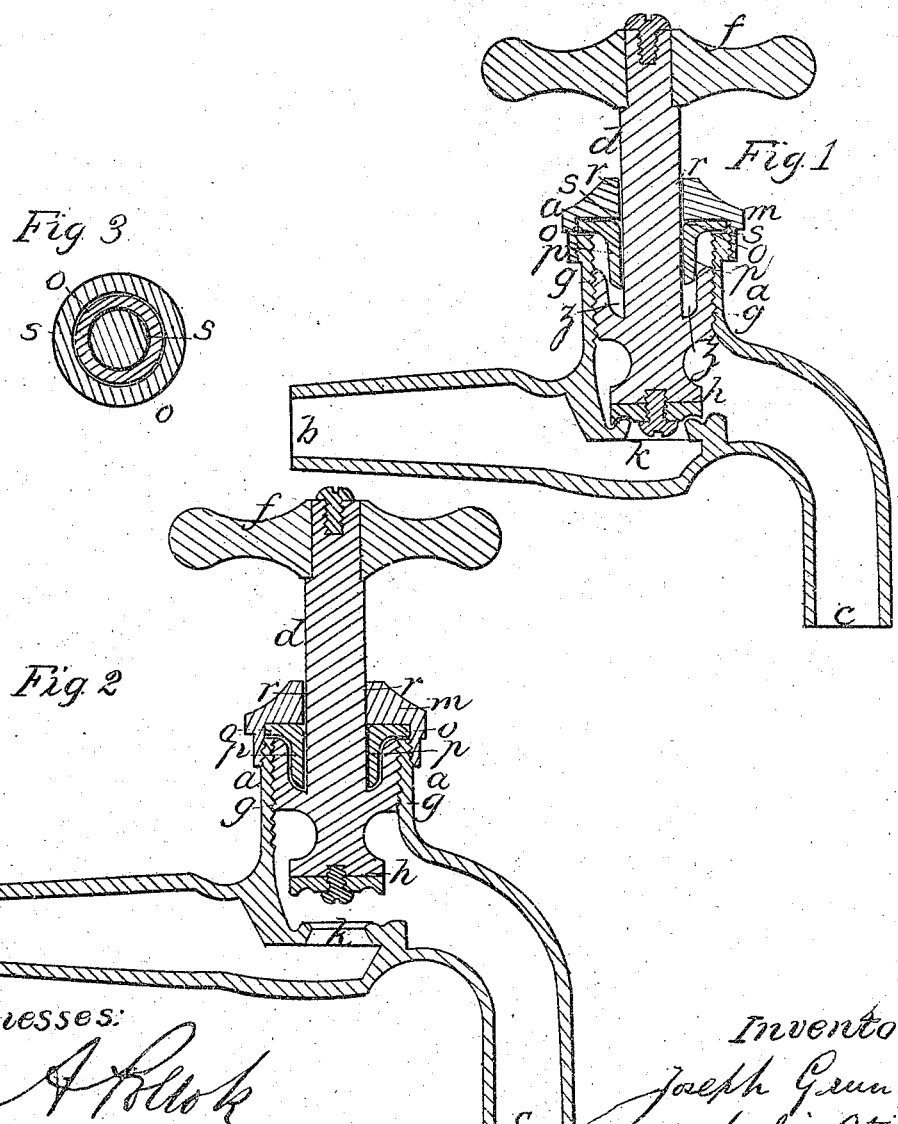

JOSEPH GRUNDY, OF STONEHAM, MASSACHUSETTS.

IMPROVEMENT IN FAUCETS.

Specification forming part of Letters Patent No. 42,286, dated April 12, 1864.

*To all whom it may concern:*

Be it known that I, JOSEPH GRUNDY, of Stoneham, in the county of Middlesex and State of Massachusetts, have invented certain new and useful Improvements in Faucets, &c., and I do hereby declare that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention relates to the manner in which the washer used in faucets for the prevention of their leakage is formed, the object being to secure a tighter joint and more permanent washer. Heretofore the washer has simply consisted of a flat piece of leather or other suitable material applied at the proper point in the faucet, the disadvantage of which was that the pressure of the liquid against the same caused it to be pulled about on the rod, thus in time enlarging its aperture to such a degree as to cause the constant leakage of the faucets; but by my improvements I so construct or form the washer to be used in faucets that the greater the pressure of liquid the tighter the washer will be, it being made thereby to more closely "hug" or inclose the rod on which it is placed. I accomplish this result by forming the washer with a projecting lip or rim around its aperture, which, when the washer is properly placed in the faucet, incases a large portion of its shaft, and also exposes a vertical as well as flat or horizontal surface for the pressure of the liquid to act against, the result and advantage of which are evident.

Having thus generally specified the object of my invention and its mode of operation, I will now describe it in detail, reference being had to the accompanying plate of drawings, of which—

Figures 1 and 2 are central longitudinal vertical sections of the faucet, one showing it opened, and the other closed; Fig. 3, a horizontal section taken through the washer and screw-rod of the faucet.

$a$ $a$ in the accompanying drawings represent a faucet made of the usual form. $b$ is the nozzle, and $c$ the end attached to the water-pipe. $d$ $d$ is a vertical screw-shaft attached to a handle, $f$, which, when turned to the right or left, raises or lowers the said shaft within the screw-socket $g$ of the faucet $a$. $h$ is a washer secured to the lower end of the shaft $d$. $k$ is an orifice forming the connection between the end $c$ and the nozzle $b$, which is opened or closed for or to the passage of liquids by the upward or downward movement of the said shaft $d$, as described. On the upper portion of the shaft, $d$, above its screw and between it and the cap-plate $m$ of the faucet, is a washer, $o$, made of leather or of other suitable material, which is designed to prevent leakage through the shaft-aperture $r$ in the cap-plate $m$. By my improvement I construct this washer as follows—viz: $o$ is a flat portion, through the aperture $s$ of which the rod $d$ passes. Around the aperture $s$ is formed a lip or collar, $p$, as shown in the drawings. This collar $p$ forms a partial casing for the shaft $d$.

In the operation of the faucet with my improved washer, it is evident that the pressure of the liquid within the socket-chamber $g$ will be brought to bear not only upon the flat portion of the washer, but also against the exterior periphery of the collar $p$, thereby causing the same, at all times when the faucet is in use, to fit tightly around the shaft $d$, which consequently prevents any leakage of the liquid through the aperture of the cap $m$.

The washer remains stationary and is held in position by the cap-plate $m$.

$z$ is a chamber, made in the screw-rod $d$, which fits around the collar $p$ of the washer $o$ $p$ and serves to keep the said collar hugged against the rod $d$ while it is being screwed up or down.

Having thus described my improvements, I shall state my claim as follows:

What I claim as my invention, and desire to have secured to me by Letters Patent, is—

In combination with the plate $m$ and screw-rod $d$, the peculiar shaped washer $o$ $p$ and chamber $z$ in the screw-rod $d$, as shown and set forth.

JOSEPH GRUNDY.

Witnesses:
JOSEPH GAVETT,
ALBERT W. BROWN.